United States Patent
Stein

(10) Patent No.: US 6,176,174 B1
(45) Date of Patent: Jan. 23, 2001

(54) DEVICE FOR THE DISCONTINUED PREPARATION OF PASTA

(76) Inventor: Hans-Ulrich Stein, Via Tersaggio, 6949 Comano (CH)

( * ) Notice: Under 35 U.S.C. 154(b), the term of this patent shall be extended for 0 days.

(21) Appl. No.: 09/284,164
(22) PCT Filed: Oct. 11, 1997
(86) PCT No.: PCT/EP97/05629
  § 371 Date: May 19, 1999
  § 102(e) Date: May 19, 1999
(87) PCT Pub. No.: WO98/16146
  PCT Pub. Date: Apr. 23, 1998

(30) Foreign Application Priority Data
  Oct. 12, 1996 (DE) .............................. 196 42 106

(51) Int. Cl.⁷ .............................. A47J 27/18; A47J 27/14
(52) U.S. Cl. .............................. 99/407; 99/403
(58) Field of Search .............................. 99/407, 403, 330, 99/410, 443 R, 443 C, 352; 426/507, 509, 113, 403, 523, 557; 227/150 HC, 150 A, 150 R

(56) References Cited

U.S. PATENT DOCUMENTS

| 5,351,605 | * 10/1994 | Sai et al. ........................... 99/407 X |
| 5,890,420 | 4/1999 | Stein ........................................ 99/407 |
| 5,997,931 | * 12/1999 | Askmane et al. ................. 99/407 X |

FOREIGN PATENT DOCUMENTS

| 195 00 973 | 7/1996 | (DE) . |
| 0 140 987 | 5/1985 | (EP) . |
| WO/92/02167 | 2/1992 | (WO) . |
| WO/92/180-40 | 10/1992 | (WO) . |

* cited by examiner

Primary Examiner—Reginald L. Alexander
(74) Attorney, Agent, or Firm—Dick and Harris

(57) ABSTRACT

Shown and described is a device for the discontinuous preparation of pasta such as spaghetti or similar, comprising a pasta supply unit (7); a pasta preparation unit closed off by inlet shutters (2) and outlet shutters (4), for cooking and draining the pasta; and a pasta dispenser unit where the design height has been reduced in that the pasta preparation unit comprises only a single chamber (1) which is used both for cooking and rinsing with cold water and draining the cooked pasta.

4 Claims, 1 Drawing Sheet

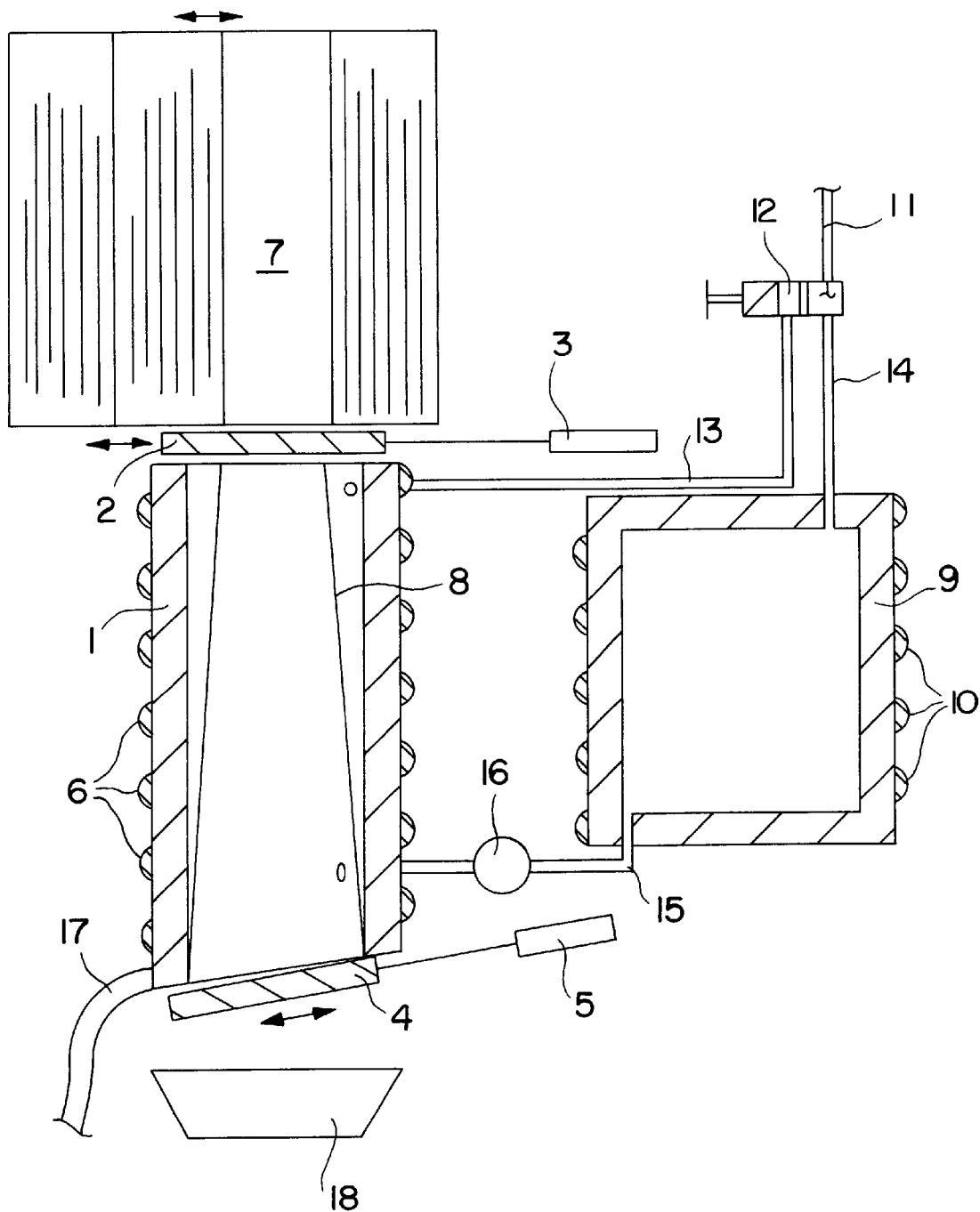

DEVICE FOR THE DISCONTINUED PREPARATION OF PASTA

The invention relates to a device for the discontinuous preparation of pasta such as spaghetti or similar, comprising a pasta supply unit and a pasta preparation unit closed off by inlet shutters and outlet shutters, for cooking and draining the pasta.

1. Field of the Invention

Such a device is known from DE 195 00 973 A1. This known device essentially comprises a pasta supply unit configured as a dosing element and a pasta preparation unit comprising a cooking chamber with a cooking chamber inlet and a cooking chamber outlet and a draining chamber whose inlet is identical to the cooking chamber outlet.

At the bottom of the draining chamber there is a draining chamber outlet. All apertures of the chamber are configured as inlet shutters or outlet shutters. In its inlet region, the cooking chamber can be closed off by a linear sliding shutter and the outlet region of the draining chamber can also be closed off by a linear sliding shutter.

2. Description of Prior Art

With the known device, preparation of the apportioned pasta is as follows:

First the outlet region of the cooking chamber is closed off from the draining chamber by a shutter hingeable around an axis. After the apportioned quantity of pasta has been supplied to the cooking chamber, the upper aperture too of the cooking chamber is closed by the linear sliding shutter. To cook the pasta, fresh water is admitted to, and heated in, a heating chamber which surrounds the cooking chamber like an annular gap. For this purpose heating elements are arranged in the partitioning wall between the cooking chamber and the heating chamber. At the same time a specified quantity of water is supplied to the cooking chamber which is then hermetically sealed.

By opening the check valve, the overpressure present in the cooking chamber after the actual cooking process, is released via a pressure relief pipe which on the one side is connected via a check valve to a drainage pipe, and on the other side via a check valve and a pipe to the draining chamber. Now the pressure in the cooking chamber is about the same as that in the draining chamber. After closing the check valve, the swivellable shutter between the cooking chamber and the draining chamber can be o opened and the cooked pasta, together with the remaining cooking water, drop into the draining chamber.

A sieve provided in the bottom region of the draining chamber provides the outlet to the outlet pipe. With the known device, draining is by way of a drainage pump.

After separation of the pasta from the cooking water, the finished portion of pasta can be discharged by means of the linear sliding shutter below, onto a plate or similar located in the pasta dispenser unit.

SUMMARY OF THE INVENTION

The known device for the discontinuous preparation of pasta has the potential for improvement. Since the device is preferably to be installed as an automatic device in public areas, it is the object of the present invention to reduce the size of the device. In addition it is desirable that the time for preparing the apportioned pasta, in particular for preparing the first portion, when the device is still cold, is reduced to a minimum, so as to cut down the waiting time for the person requesting the product.

This object is met in that the pasta preparation unit only comprises a single chamber which is used both for cooking and rinsing with cold water and draining the cooked pasta.

In this way, by completely doing without a separate draining chamber, it was possible to reduce the design height of the device for the discontinuous preparation of pasta. In addition, there is no longer any conveyance of the cooked pasta from the cooking chamber to the draining chamber. Instead, rinsing with cold water can be started immediately following the cooking process, within this single chamber; thus reducing the entire preparation time for the pasta.

According to one embodiment of the invention, the single chamber is low in mass. This low mass of the single chamber too, contributes to a reduction in time of the preparation cycles because after rinsing with cold water and pressure relief, the cooler chamber of lower mass can again reach operating temperature more quickly. To this effect, a single heating coil surrounding the chamber, preferably an electrically operated heating coil, which may comprise several heating circuits, is particularly suitable According to further embodiments of the invention, the single chamber is of elongated shape with the inside being either conical or cylindrical. If the single chamber is cylindrical, it preferably comprises a conical insert. The conical shape of the cooking chamber by itself is already known from the known device; it ensures that the prepared pasta reliably leaves the cooking chamber when the pasta is dispensed.

It is particularly suitable if a sieve is provided as a conical insert and if the conical insert is arranged so as to be spaced apart from the interior wall of the single chamber. In this way, circulation of steam and water is facilitated and a direct contact between the hot interior wall of the single chamber and the pasta is reliably prevented. The smaller contact area between pasta and sieve minimises the danger of "sticking".

A further embodiment of the invention provides for the device to be configured as an automatic device comprising a hot water storage tank. By using a separate hot water storage tank, the time for heating the single chamber can be reduced still further, because during rinsing with cold water and dispensing the already prepared portion of pasta, the required quantity of hot water for the next portion can already be heated in the hot water storage tank to a temperature exceeding the operating temperature by such a margin that after this water is supplied to the cooking chamber it has the necessary operating temperature. If such a hot water storage tank is used, it is advantageous i f the volume and/or the operating temperature of the hot water storage tank is larger than or higher than the volume or the operating temperature of the single chamber.

A particularly simple construction is achieved in that, according to a further embodiment of the invention, the water inlet pipes and/or water outlet pipes of the single chamber are provided in the shutters closing off the chamber. In this way, the single chamber only comprises the inlet apertures or outlet apertures, with all sealing elements being arranged in the region of the shutters. This is of particular advantage also for exchanging the sealing elements and for the respective maintenance work.

Below, the invention is illustrated in more detail in a drawing showing only one embodiment.

BRIEF DESCRIPTION OF THE DRAWINGS

The only FIGURE shows a diagrammatic cross section of the device according to the invention.

DETAILED DESCRIPTION OF PREFERRED EMBODIMENT

Shown is a single chamber 1, used as a cooking chamber and as a draining chamber which is closed off at the top by an inlet shutter 2 which is driven by a motor 3 so as to be slidable in linear movement along the double arrow. Towards the bottom, closing off is by an outlet shutter 4 which is also slidable in a linear movement by a motor 5.

A heating coil 6 is arranged around the chamber 1. For operation, the upper inlet shutter 2 opens, resulting in an apportioned quantity of pasta dropping into the chamber 1 whose interior comprises a conical sieve 8, from a pasta supply unit 7 slidable above the chamber 1.

After closing the inlet shutter 2, a hot water storage tank 9 which is preferably separate, comprising a heating coil 10, supplies a specified quantity of hot water by way of pump 16 to the chamber 1 via the hot water pipe 15. This water had previously been supplied to the hot water tank 9 by a fresh water inlet 11 and a valve 12 from which an inlet pipe 13 leads into chamber 1 and an inlet pipe 14 which leads into the hot water storage tank.

Preferably, the temperature of the water already in the hot water storage tank is sufficiently high for the water forced into the chamber 1 to be able to be brought immediately to operating temperature (cooking temperature). To this effect, the chamber 1 is of course hermetically sealed.

Even if in the embodiment shown, for the sake of clarity, the water inlet and outlet pipes end in chamber 1, it is also imaginable to integrate them into the sliding shutters 2 and 4 so as to keep chamber 1 free of any further apertures.

Upon completion of the cooking process of the apportioned pasta, cold fresh water for rinsing the pasta is supplied to chamber 1 by way of pipe 13. After cooling and pressure decrease, a valve (not shown) opens allowing the water in the single chamber 1 to drain via outlet 17. It has been shown that there is no need for a drainage pump if the outlet of the single chamber 1 is arranged at the lowest point of said chamber 1.

After complete draining of the water, the outlet shutter 4 opens, and the prepared pasta can drop onto a plate 18 or similar provided in the pasta dispenser unit where it can be collected by the person requesting the product.

During rinsing with cold water and removal of the prepared pasta, the next batch of hot water is already being prepared in the hot water storage tank 9, so as speed up the preparation of the next portion of pasta in chamber 1.

What is claimed is:

1. A device for the discontinuous preparation of pasta such as spaghetti or similar, comprising a pasta supply unit and a pasta preparation unit closed off by an inlet shutter for the introduction of pasta into the pasta preparation unit and an outlet shutter for the removal of pasta from the pasta preparation unit;

said pasta preparation unit characterized in that the pasta preparation unit comprises a single chamber, having at least one water inlet pipe for the introduction of water into the single chamber and at least one water outlet pipe for the drainage of water from the single chamber, which, pasta preparation unit in combination with heating means, is used for cooking the pasta and subsequently rinsing said cooked pasta with water; the pasta being removed through the outlet shutter; and said single chamber being of elongated shape, with the inside being cylindrical, comprising a conical insert.

2. A device according to claim 1, characterized in that a sieve is provided as a conical insert.

3. A device according to claim 1, characterized in that the conical insert is arranged so as to be spaced apart from the interior wall of the chamber.

4. A device according to claim 1, characterized in that the at least one of the water inlet pipes and water outlet pipes of the single chamber are provided in the inlet shutters or outlet shutters.

* * * * *